(12) United States Patent
Breau et al.

(10) Patent No.: US 7,944,887 B1
(45) Date of Patent: May 17, 2011

(54) METHOD AND SYSTEM FOR FORCING MOBILE IP HOME AGENT HANDOFF

(75) Inventors: Jeremy R. Breau, Kansas City, MO (US); Arun Santharam, Olathe, KS (US)

(73) Assignee: Sprint Spectrum L.P., Overland Parks, KS (US)

( * ) Notice: Subject to any disclaimer, the term of this patent is extended or adjusted under 35 U.S.C. 154(b) by 734 days.

(21) Appl. No.: 11/876,424

(22) Filed: Oct. 22, 2007

(51) Int. Cl.
*H04W 4/00* (2009.01)

(52) U.S. Cl. ........ 370/331; 370/338; 370/349; 455/436; 455/439; 455/442

(58) Field of Classification Search .................. 370/331, 370/338, 328, 389; 455/432.1, 435.1
See application file for complete search history.

(56) References Cited

U.S. PATENT DOCUMENTS

| | | | |
|---|---|---|---|
| 2002/0067704 A1* | 6/2002 | Ton | 370/329 |
| 2003/0224792 A1* | 12/2003 | Verma et al. | 455/436 |
| 2005/0286471 A1* | 12/2005 | Yang et al. | 370/331 |
| 2006/0067271 A1* | 3/2006 | Chen et al. | 370/331 |
| 2007/0254661 A1* | 11/2007 | Chowdhury et al. | 455/436 |

OTHER PUBLICATIONS

Chen and Boult, "Dynamic Home Agent Reassignment in Mobile IP," (2002).

* cited by examiner

*Primary Examiner* — Ricky Ngo
*Assistant Examiner* — Rasheed Gidado (57) ABSTRACT

When a mobile node hands off to a new network access server/foreign agent (NAS/FA) and establishes a data link layer connection with the new NAS/FA, the NAS/FA will determine whether the mobile node is registered with a preferred home agent. If not, the NAS/FA will force the mobile node to hand off to the preferred home agent, while maintaining the data link layer connection with the mobile node.

19 Claims, 5 Drawing Sheets

METHOD AND SYSTEM FOR FORCING MOBILE IP HOME AGENT HANDOFF

FIELD OF THE INVENTION

The present invention relates to telecommunications and, more particularly, to Mobile-IP communication.

BACKGROUND

Mobile-IP (MIP) is well known in the industry. As a general matter, a mobile node may establish a data link layer connection with a MIP foreign agent, and the mobile node may then register with a MIP home agent to obtain a home IP address (home address or HoA), which the home agent would correlate with the foreign agent's IP address (care-of address or CoA). In practice, the mobile node would then send outbound communications from its HoA (i.e., using its HoA as the source IP address in its communications). Response communications destined to that HoA would be routed to the home agent, and the home agent would in turn forward those communications to the corresponding CoA. The foreign agent would then pass the communications via the data link layer connection to the mobile node.

The data link layer connection between the mobile node and the foreign agent can take various forms, compliant with various protocols, examples of which include without limitation the well known Point to Point Protocol (PPP) and IP Security (IPsec) protocol. In CDMA communications, PPP data link connections are typically used between mobile nodes and foreign agents in packet data serving nodes (PDSNs) that provide packet-network connectivity. In WiFi communications (e.g., using 802.11), on the other hand, IPsec is typically used between mobile nodes and foreign agents and is currently proposed to be used for communication between mobile nodes and foreign agents in packet data interworking functions (PDIFs) that provide packet-network connectivity.

An IPsec data link defines a secure tunnel of communication between two endpoints such as between the mobile node and a PDIF. In particular, when the mobile node has bearer packets to transmit (typically with the mobile node's HoA as source address), the mobile node would encrypt the packets in an agreed manner and encapsulate the encrypted packets in an IPsec outer packet header destined to the PDIF. The source IP address of the underlying packets, known as the "tunnel inner address" (TiA) would be the mobile node's IP address (e.g., its HoA), which would be routable to the PDIF, and the destination IP address of the underlying packets would be the destination to which the mobile node wishes to send the packets. The source IP address in the IPsec encapsulation header (the outer packet header), on the other hand, known as the "tunnel outer address" (ToA), will be one agreed between the mobile node and the PDIF, and the destination IP address in the IPsec encapsulation header will be the IP address of the PDIF. As the PDIF receives those packets, the PDIF would then strip the IPsec encapsulation headers, decrypt the underlying packets, and send the packets along their way to their specified destination. Similar communication can occur through the IPsec tunnel in the reverse direction as well.

When a mobile node that is already registered with a MIP home agent via a particular foreign agent ("source foreign agent") moves to a network having a new foreign agent ("target foreign agent") and establishes a data link layer connection with the target foreign agent, the mobile node generally engages in a new MIP registration (re-registration) process, to correlate the target foreign agent's CoA with the mobile node's HoA.

In particular, the target foreign agent would transmit an agent advertisement message (ICMP Type 9 message) that would specify the target foreign agent's IP address (CoA). Conventionally, the mobile node would receive that message and responsively send a new MIP registration request (RRQ) to the indicated CoA (e.g., the MIP RRQ would have as a source address the mobile node's HoA and a destination address the target foreign agent's indicated CoA), specifying in the MIP RRQ (i) the mobile node's home agent's IP address, (ii) the mobile node's HoA, and (iii) the CoA of the target foreign agent. The target foreign agent would then authenticate the mobile node, typically through signaling with an authentication, authorization, and accounting (AAA) server and, assuming successful authentication, transmit the MIP RRQ along to the indicated home agent IP address (after possibly changing the source address to be the IP address of the target foreign agent). The home agent would then update the registration of the mobile node to correlate the mobile node's HoA with the CoA of the target foreign agent. And the home agent would send an MIP registration reply (RRP) message to the target foreign agent, which the target foreign agent would send along to the mobile node.

When a mobile node moves between PDSNs in a CDMA system for instance, the mobile node would first establish a PPP link with the target PDSN. Upon receipt of an agent advertisement from the target PDSN, the mobile node would then send an MIP RRQ to the target PDSN, specifying the mobile node's home agent's IP address, the mobile node's HoA, and the target PDSN's CoA, which the target PDSN would pass along to the home agent after authenticating the mobile node. The home agent would then update the mobile node's registration and send an MIP RRP to the target PDSN, which the target PDSN would send along to the mobile node.

When a mobile node moves between a PDIFs in a WiFi system, the mobile node would first establish an IPsec tunnel with the target PDIF. To do so, the mobile node would first obtain a ToA, through Dynamic Host Control Protocol (DHCP) signaling for instance, for use in communicating with the PDIF. In turn, the mobile node and PDIF would engage in an internet key exchange (IKE) to agree on encryption parameters, and the PDIF would assign a TiA for use by the mobile node, possibly with a PANA (protocol for carrying authentication for network access) message to the mobile node. Under IPsec, the TiA can be any non-zero IP address preferably routable to the PDIF, possibly the mobile node's existing HoA if the mobile node has one, and is used as a security parameter so that the other IPsec endpoint (e.g., PDIF) can validate packet transmissions in the tunnel by ensuring that the TiA is what the endpoint expected the TiA to be.

Once the mobile node has the established IPsec tunnel with a target PDIF, the target PDIF sends an agent advertisement message to the mobile node, providing the mobile node with the target PDIF's CoA. Upon receipt of that agent advertisement message, the mobile node would then send an MIP RRQ to the target PDIF, specifying the mobile node's home agent's IP address, the mobile node's HoA, and the target PDIF's CoA, which the target PDIF would pass along to the home agent after authenticating the mobile node. The home agent would then update the mobile node's registration and send an MIP RRP to the target PDIF, which the target PDIF would send along to the mobile node.

Further, at that point, the target PDIF may then reassign the mobile node's TiA to be the mobile node's HoA (if it was not the mobile node's HoA already). That way, the mobile node can then send communications via the IPsec tunnel from the mobile node's HoA, so that response communications will be properly routed via the home agent back to the PDIF for transmission to the mobile node. In particular, from that point forward (if not already), the mobile node would use as the TiA its HoA.

SUMMARY

In some cases, it may be desirable to hand off a mobile node to a new MIP home agent when the mobile node moves to be served by a new MIP foreign agent. For instance, there may be a home agent located more closely to the target foreign agent, or the operator of the target foreign agent may desire for one reason or another that a particular home agent (different than the mobile node's existing home agent) be used. Generally, there may be a preferred home agent associated with the target foreign agent or otherwise desirable.

After a mobile node engages in MIP re-registration so as to register its new (target) foreign agent's CoA with its home agent, the target foreign agent may thus determine whether the mobile node is currently registered with the preferred home agent—as indicated by the home agent IP address that the mobile node included in its MIP RRQ. If the mobile node is currently registered with the preferred home agent, then the target foreign agent would not force a home agent handoff, as no handoff would be necessary. On the other hand, if the mobile node is not currently registered with the preferred home agent, then the target foreign agent will force the mobile node to handoff to the preferred home agent.

To force a home agent handoff, the target foreign agent may orchestrate a teardown of the mobile node's MIP existing session, so that the mobile node will responsively engage in a new mobile-IP registration with the preferred home agent. In particular, the target foreign agent may send to the mobile node an MIP RRQ with a registration lifetime parameter set to zero (i.e., lifetime=0). In response, the mobile node would then send an MIP RRP to the target foreign agent confirming that the mobile node has torn down the MIP session. After tearing down the mobile node's MIP session, the target foreign agent may then send an agent advertisement message as described above, in response to which the mobile node would send a MIP RRQ, and the target foreign agent would pass the MIP RRQ along to the preferred home agent, so as to facilitate registration of the mobile node with the preferred home agent.

One problem that can arise with forced home agent handoff like this is that it can disrupt data communication to/from the mobile node. That is, if the mobile node is currently engaged in data communication, the home agent handoff process can interrupt that data communication. In a worst case, the handoff process could result in lost data or corruption of communications.

To solve this problem, in a preferred embodiment, the target foreign agent will force a handoff only once the mobile node is in an idle state (not sending/receiving data), e.g., for a threshold period of time. Thus, in practice, after a mobile node has newly registered through a target foreign agent, if the target foreign agent determines that the mobile node is not currently registered with the preferred home agent, the target foreign agent will wait for the mobile node to become idle (preferably idle for a threshold period of time). In response to a determination that the mobile node is idle and is not currently registered with the preferred home agent, the target foreign agent will then force the mobile node to handoff to the preferred home agent, in the manner described above for instance.

A further problem that can arise in this process is that the act of tearing down the mobile node's MIP session can cause the mobile node to also tear down its data link with the target foreign agent. In particular, when a mobile node loses its MIP session (such as at the home agent's initiation), the mobile node may automatically send to its foreign agent a request to tear down its data link, and the foreign agent may acknowledge the request, thus tearing down the mobile node's data link. In PPP, for instance, this teardown request may be a PPP "CONFIG_TERMINATE" request, and the foreign agent would respond with an acknowledgement. Similar messaging may occur with IPsec or other data links.

In the situation where the foreign agent itself should still be serving the mobile node (and has caused a teardown of the mobile node's MIP session simply to force a home agent handoff), it is an inefficient waste of resources to tear down the mobile node's data link with the foreign agent. That is, the data link would be torn down, and the mobile node would then need to newly acquire the data link again before engaging in MIP registration with the preferred home agent.

To overcome this further problem, in a preferred embodiment, the target foreign agent will be arranged to maintain its data link with the mobile node when forcing a handoff of the mobile node to a preferred home agent. For instance, once the mobile node's MIP session is torn down, if the mobile node responsively sends a data link teardown request to the foreign agent, the foreign agent will preferably reject that request, so as to avoid teardown of the mobile node's data link. For instance, with PPP, after tearing down the mobile node's MIP session to force a home agent handoff, if the foreign agent then receives PPP "CONFIG_TERMINATE" message, the foreign agent may send a CONFIG_REJECT message to the mobile node, to reject the data link teardown request, and to thereby maintain the mobile node's data link.

In IPsec, an additional problem that can arise with forced home agent handoff as described above is that, after teardown of the mobile node's old MIP session, the new MIP RRQ that the mobile node sends to the target foreign agent may set forth the mobile node's old HoA as its TiA (tunnel inner address). Consequently, when the preferred home agent receives that RRQ, updates the mobile node's registration, and sends a MIP RRP, the RRP might get routed to the mobile node's old home agent (with which the indicated HoA was associated), which could result in loss of the response and other problems.

To overcome this additional problem, once the target foreign agent tears down the mobile node's MIP session as described above, the target foreign agent will preferably assign as a new TiA to the mobile node (e.g., with PANA signaling as described above) an IP address different than the mobile node's old HoA. In particular, the target foreign agent may assign as a new TiA to the mobile node some other IP address that is routable to the target foreign agent. That way, when the new, preferred home agent sends an RRP in response to the mobile node's RRQ, the RRP would be properly routed to the target foreign agent, for transmission in turn to the mobile node.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

An exemplary embodiment of the present invention may take various forms, examples of which include an improved network access server/foreign agent, and a method carried out by such an entity.

Figure 1:
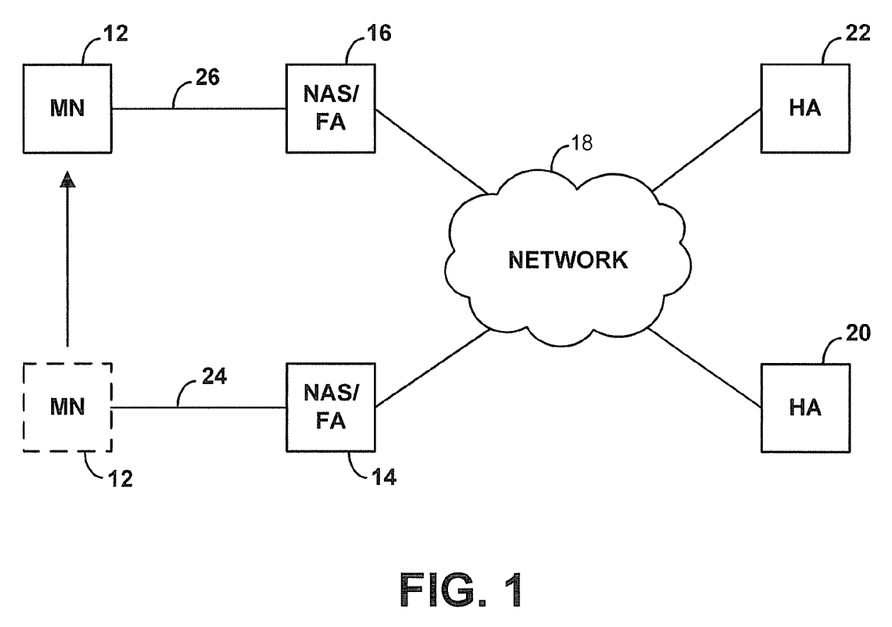
FIG. 1 is a simplified block diagram of a network arrangement in which an exemplary embodiment of the invention can be implemented.

FIG. 1 is a simplified block diagram depicting a network arrangement in which the exemplary embodiment can be implemented. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by a device, system, or other entity, it should be understood that the functions may be implemented by software (e.g., machine language instructions stored in data storage and executable or interpretable by a processor), firmware, and/or hardware.

As shown in FIG. 1, a basic network arrangement includes a mobile node (MN) 12, a first network access server (NAS)/foreign agent (FA) 14, a second NAS/FA 16, a network 18, a first home agent (HA) 20, and a second HA 22. Mobile node 12 may be a portable, handheld, battery-powered wireless communication device, or may be another type of device. NAS/FA 14 and NAS/FA 16 sit as nodes on network 18, and HA 20 and HA 22 sit as nodes on network 18. Network 18 is preferably a packet-switched network such as the Internet and/or one or more private packet networks, supporting IP communication in accordance with known principles. Accordingly, NAS/FA 14, NAS/FA 16, HA 20, and HA 22 each have a respective IP address routable on network 18.

NAS/FA 14 is operable to communicate with and serve mobile node 12 via a communication link 24 (which may include wired, wireless, circuit-switched, packet-switched, networked and/or direct connection connections), so as to provide mobile node 12 with connectivity to network 18. When mobile node powers on or enters into a network or area served by NAS/FA 14, mobile node 12 may thus establish communication with NAS/FA 14 via link 24 and then communicate on network 18 via link 24 and NAS/FA 14.

Similarly, NAS/FA 16 is operable to communicate with and serve mobile node 12 via a communication link 26 (which may similarly include wired, wireless, circuit-switched, packet-switched, networked and/or direct connection connections), so as to also provide mobile node 12 with connectivity to network 18. When mobile node powers on or enters into a network or area served by NAS/FA 16, mobile node 12 may thus establish communication with NAS/FA 16 via link 26 and then communicate on network 18 via link 26 and NAS/FA 16.

In addition to providing mobile node 12 with connectivity to network 18, NAS/FA 14 and NAS/FA 16 each also operate to support mobility under mobile-IP (MIP) (i.e., the well known "mobile-IP" protocol or any similar protocol). Further, HA 20 and HA 22 each operate to support mobility under MIP as well.

In practice, when mobile node 12 first enters into coverage of an NAS/FA, the mobile node 12 may establish a physical link layer connection over which to communicate over the link with the NAS/FA, and the mobile node 12 may establish a data link layer connection, such as a PPP connection or IPsec tunnel, with the NAS/FA. As discussed above, the NAS/FA may then transmit an agent advertisement message (ICMP Type 9 message) that would specify the IP address of the NAS/FA as a MIP CoA. In response, the mobile node 12 would then send a MIP RRQ to the CoA, which the NAS/FA would forward to an HA. If this is an initial MIP registration for the mobile node, the HA may then assign an HoA for the mobile node, associate it with the CoA of the NAS/FA, and return it to the NAS/FA in an MIP RRP for transmission in turn to the mobile node. On the other hand, if this is a re-registration by the mobile node, the HA may simply associate the mobile node's existing mobile-IP address with the CoA of the NAS/FA and then similarly return an MIP RRP for transmission in turn to the mobile node.

FIG. 1 shows movement of mobile node 12 from a situation where the mobile node is served by NAS/FA 14 (with mobile node 12 shown in dashed lines) to a situation where the mobile node is served by NAS/FA 16 (with the mobile node shown in solid lines). When the mobile node is served by NAS/FA 14, the mobile node may be registered with HA 20. Under standard procedures, when the mobile node moves to be served by NAS/FA 16, the mobile node will establish a data link with the NAS/FA 16, using the procedures discussed above or other procedures, and the mobile node will then undergo MIP re-registration through NAS/FA 16 so that HA 20 will correlate the mobile node's HoA with the CoA of NAS/FA 16.

To facilitate this handoff between NAS/FA 14 and NAS/FA 16 as the mobile node physically moves from link 24 to link 26, NAS/FA 14 and NAS/FA 16 may communicate with each other to establish a fast-handoff tunnel (e.g., via network 18). Until the mobile node fully completes its MIP re-registration through NAS/FA 16, this tunnel can be used to shunt the mobile node's IP communications via NAS/FA 14, so that when HA 20 forwards IP communications to the mobile node, they will pass to NAS/FA 14, from there to NAS/FA 16, and from there to the mobile node. Once the mobile node completes its MIP re-registration through NAS/FA 16, the fast handoff tunnel can be torn down.

Figure 2:
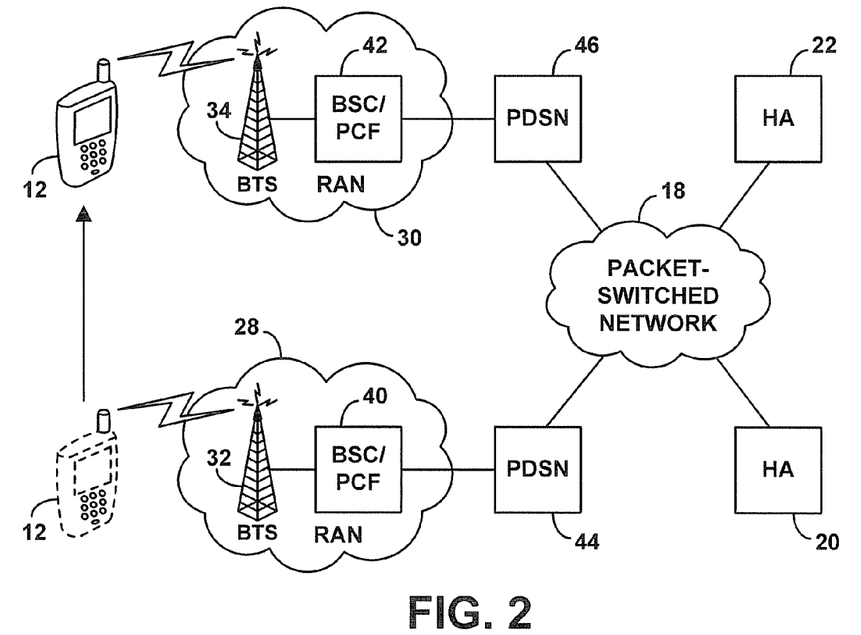
FIGS. 2 and 3 are more detailed, but still simplified, block diagrams of network arrangements in which the exemplary embodiment can be implemented.
Figure 3:
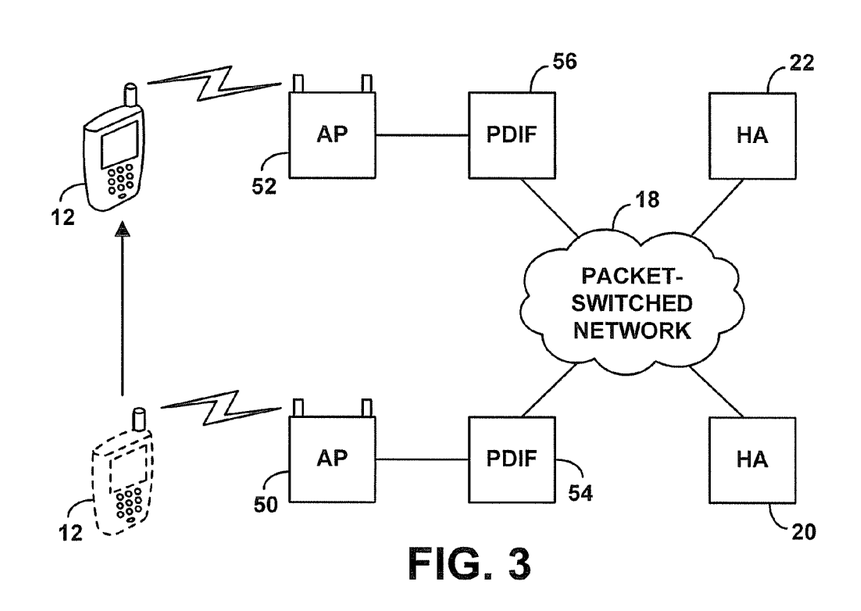

Without loss of generality, FIGS. 2 and 3 next depict by way of example more specific versions of the network arrangement shown in FIG. 1.

In FIG. 2, the mobile node 12 is shown as a cellular wireless device such as a cell phone or wirelessly-equipped personal computer or personal digital assistant, and each of the communication links 24, 26 is shown comprising a cellular radio access network (RAN) 28, 30. Each RAN may take any of a variety of forms, and the RANs may be different from each other. For simplicity, FIG. 2 depicts each RAN as including a base transceiver station (BTS) 32, 34, which radiates to define an RF air interface 36, 38 between the RAN and mobile node 12. Each BTS 32, 34 is then coupled with a base station controller (BSC)/packet control function (PCF) 40, 42. Conventionally in this arrangement, each NAS/FA 14, 16 is a PDSN 44, 46, which functions to provide packet-network connectivity and to support MIP mobility for entities such as mobile node 12 that are served by the respective RANs 28, 30.

The arrangement of FIG. 2 works in much the same way as the arrangement of FIG. 1, although the connection between the mobile node 12 and each NAS/FA 14, 16 (PDSN 44, 46) comprises a cellular wireless data connection. In practice, the cellular wireless connection with mobile node 12 can take any of a variety of forms and may comply with any cellular wireless communication protocol now known or later developed, including for instance CDMA (e.g., 1xRTT, 1xEV-DO), iDen, WiMAX, TDMA, GSM, or GPRS.

In the cellular wireless arrangement, mobile node 12 may obtain a radio link layer connection with a RAN and then a data link layer connection, such as a PPP session, with the corresponding PDSN, and the mobile node may then acquire or register a mobile IP home address with a home agent. Under the CDMA2000 protocol, for instance, the mobile node may send a packet-data origination request over the air interface to the RAN. The BSC/PCF would then assign an air interface traffic channel defining a radio link layer connection (physical layer connection) for use by the mobile node. Further, the BSC/PCF would signal with the PDSN, and the PDSN and mobile node would then negotiate to establish a PPP session. In this process, a logical radio-packet (R-P) link will be established for the mobile node, between the PDSN and the BSC/PCF, to carry packet-data communications to and from the mobile node. Upon establishment of the data link layer connection between the mobile node and the PDSN, the mobile node may then receive an agent advertisement message designating a CoA of the PDSN, and the mobile node may responsively engage in MIP registration or re-registration through the PDSN.

In FIG. 3, the mobile node is shown as a wirelessly-equipped device (also possibly a cell phone or wirelessly equipped personal digital assistant), but each of the communication links 24, 26 is shown as a WiFi (e.g., 802.11) link including a WiFi access point router 50, 52. In this arrangement, each WiFi access point 50, 52 is communicatively coupled with (or includes) a PDIF 54, 56 that provides packet-network connectivity and supports MIP mobility for entities such as mobile node 12 that are served by the respective WiFi access points 50, 52.

The arrangement of FIG. 3 also works in much the same way as the arrangement of FIG. 1, although the connection between the mobile node and each NAS/FA 14, 16 (PDIF 50, 52) comprises a WiFi connection. In this WiFi arrangement, mobile node 12 may obtain a radio link layer connection with a WiFi access point using known 802.11 or another protocol, and the mobile node may then acquire a data link layer connection, such as an IPsec tunnel, with the corresponding PDIF. The mobile node may then acquire or register a MIP home address with a home agent.

Figure 4:
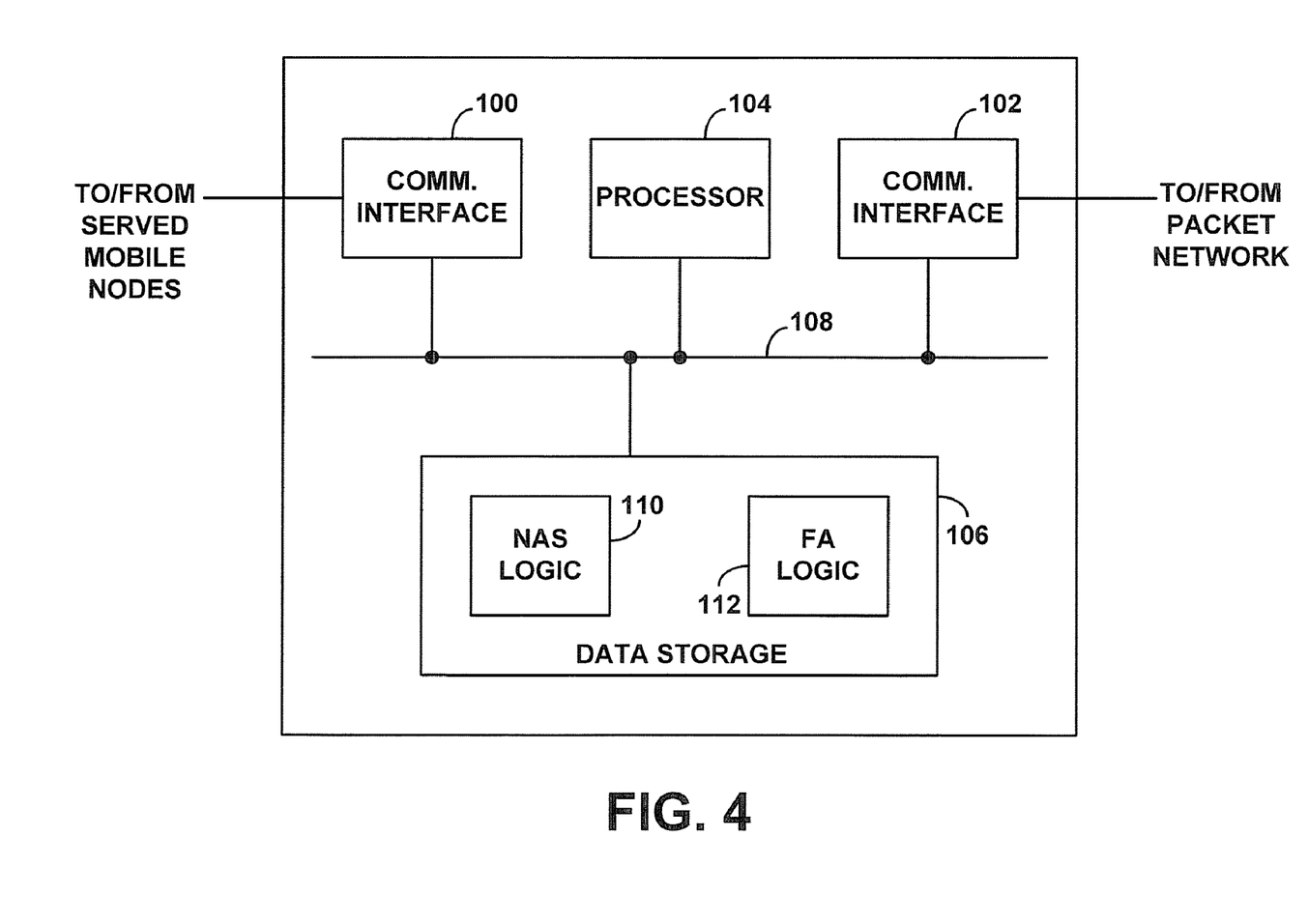
FIG. 4 is a simplified block diagram of a network access server/foreign agent having logic for carrying out functions of the exemplary embodiment.

FIG. 4 is next a simplified block diagram showing some of the functional components that may be included in an exemplary (i.e., example) NAS/FA, such as NAS/FA 14 or 16 for instance. As shown in FIG. 2, the exemplary NAS/FA includes a first communication interface 100, a second communication interface 102, a processor 104, and data storage 106, all of which may be coupled together by a system bus, network, or other mechanism 108.

Communication interface 100 functions to enable the exemplary NAS/FA to communicate with served mobile nodes, such as mobile node 12 for instance. As such, the form and function of interface 100 may vary depending on the structure of the link through which the NAS/FA communicates with served mobile nodes. In a robust embodiment, however, interface 100 may be a generic interface such as an Ethernet or T1 interface for instance (wired or wireless), suitable for connecting with any of a variety of communication links, such as RANs, WiFi access points, or other entities that facilitate communication with served mobile nodes.

Communication interface 102, in turn, functions to enable the NAS/FA to communicate on network 18. As such, communication interface 102 may vary depending on the structure of network 18. Preferably, however, interface 102 is a generic interface, such as an Ethernet interface (also wired or wireless), for instance, suitable for connecting with a packet-switched network. Although communication interface 102 is shown and described as being separate from communication interface 100, the two interfaces could be integrated together or arranged in other ways.

Processor 104 comprises one or more general purpose processors (e.g., INTEL microprocessors) and/or special purpose processors (e.g., digital signal processors or application specific integrated circuits). And data storage 106 comprises one or more volatile and/or non-volatile storage components, such as magnetic, optical, or organic storage, which may be integrated in whole or in part with processor 104.

Data storage 106 preferably contains program instructions (e.g., machine language instructions) executable or interpretable by processor 104 to carry out various functions described herein. As shown, for instance, data storage 106 preferably contains NAS logic 110 executable by processor 104 to carry out various NAS functions described herein, such as to transcode and pass communications between interface 100 and interface 102 and thus between served mobile nodes and network 18. Further, data storage 106 also preferably contains FA logic 112 executable by processor 104 to carry out various FA functions described herein.

By convention, mobile-IP supports handing off a mobile node from one foreign agent to another while maintaining the mobile node's use of a particular home agent (merely by updating the mobile node's MIP registration to correlate with the CoA of the new foreign agent). As discussed above, however, there may be reasons why it would be desirable to force a mobile node to handoff from its existing home agent to a new home agent. For instance, as noted above, there may be a home agent located more closely to the new foreign agent, or the operator of the new foreign agent may desire for one reason or another that a particular home agent (different than the mobile node's existing home agent) be used.

Referring back to FIG. 1, for instance, when mobile node 12 is served by NAS/FA 14, the mobile node may be registered with HA 20. As the mobile node moves to be served by NAS/FA 16, the mobile node may then re-register with HA 20 to correlate the mobile node's HoA with the CoA of NAS/FA 16. However, when mobile node 12 is being served by NAS/FA 16, there may be some reason why HA 22 is preferred. Thus, it would be desirable to force a handoff of the mobile node from HA 20 to HA 22. Yet it would be desirable to do so in a way that helps to avoid the problems identified above, such as interrupting the mobile node's ongoing communication or inefficiently causing the mobile node to lose its data link only to then reacquire it.

The exemplary embodiment provides a mechanism for facilitating such home agent handoff.

Figure 5:
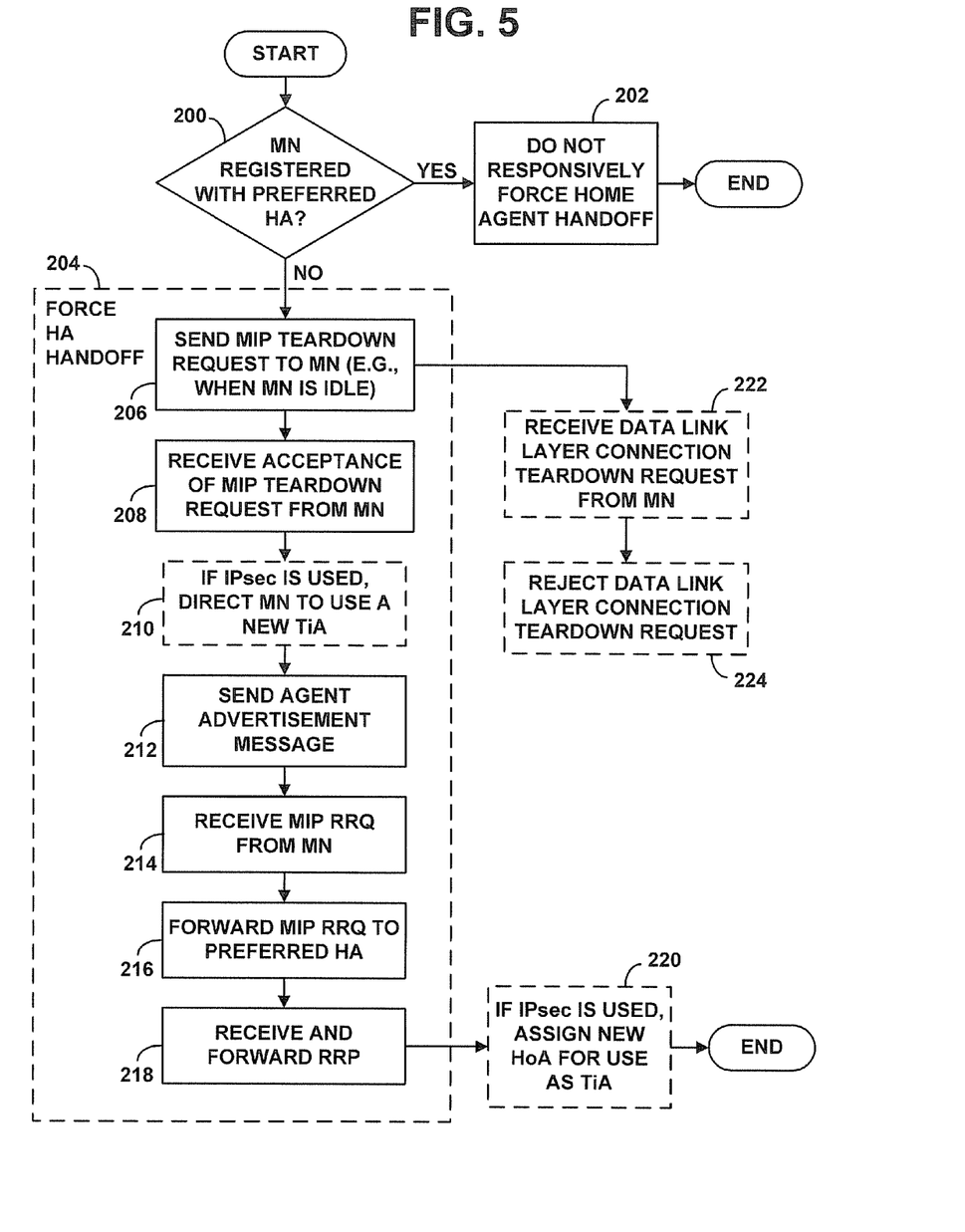
FIG. 5 is a flow chart depicting functions that can be carried out in accordance with the exemplary embodiment.

FIG. 5 is a flow chart depicting functions that can be carried out by an exemplary NAS/FA in accordance with the exemplary embodiment. In particular, FIG. 5 depicts functions that can be carried out by a NAS that operates as a MIP FA, to manage communications with a mobile node that has a data link layer connection with the NAS and that has a MIP session with a MIP home agent. In the context of FIG. 1, for instance, this may occur if mobile node 12 was registered with HA 20 while being served by NAS/FA 14 via link 24, and mobile node 12 then moves to be served by NAS/FA 16 via link 26 and re-registers with HA 20 to correlate the CoA of NAS/FA 16 with the mobile node's HoA.

As shown in FIG. 5, at block 200, the NAS makes a determination of whether the first MIP home agent is a particular MIP home agent. For instance, NAS/FA 16 may be associated with HA 22 or may otherwise determine (e.g., based on the location of mobile node 12, a profile of mobile node 12, time of day, or other factors) that HA 22 is a preferred home agent. NAS/FA 16 may thus determine whether the home agent with which mobile node 12 is currently registered, namely, HA 20, is the preferred home agent.

The NAS may make this determination in response to the mobile node handing off to the NAS or in response to some other triggering event. Further, the NAS may make the determination based on the home agent IP address that the mobile node includes in a MIP RRQ the mobile node sends to the NAS. For instance, the NAS may receive from the mobile node an MIP RRQ that designates an IP address of the first home agent, and the NAS may determine whether the designated IP address is a predefined, known IP address of the particular home agent.

Alternatively or additionally, the NAS may make the determination based on other information, such as information in an MIP RRP returned by the first home agent. Furthermore, the act of determining that the first home agent is the particular home agent could involve determining that the first home agent is any one of a group of preferred home agents, as opposed to being one of a group of non-preferred home agents.

If the determination is that the first MIP home agent is the particular MIP home agent, then, at block 202, the NAS will not respond to the determination by forcing handoff of the mobile node to the particular MIP home agent, as the mobile node is already registered with the particular home agent.

On the other hand, if the determination is that the first MIP home agent is not the particular MIP home agent (e.g., is not the one preferred, or one of those preferred), then, at block 204, the NAS will force (i.e., cause) a handoff of the mobile node to the particular MIP home agent (e.g., to one of those preferred).

The NAS may force a handoff of the mobile node to the particular MIP home agent. In particular, at step 206, the NAS may generate and send to the mobile node a MIP, via the data link layer connection for instance, a teardown request requesting teardown of the MIP session. At step 208, the NAS may then receive from the mobile node, also via the data link layer connection for instance, an acceptance of the MIP teardown message. At step 212, the NAS may then send an agent advertisement message to the mobile node, to trigger MIP registration by the mobile node. At step 214, the NAS may then receive an MIP RRQ sent by the mobile node in response to the agent advertisement message. And at step 216, the NAS may then send the MIP RRQ to the particular MIP home agent (after possibly modifying or regenerating the RRQ), to facilitate registration of the mobile node with the particular MIP home agent. And at step 218, the NAS may receive from the MIP home agent an MIP RRP and forward the MIP RRP to the mobile node (after possibly modifying or regenerating the RRP). Alternatively, the NAS may force handoff of the mobile node to the particular MIP in some other way.

As noted above, to avoid having this home agent handoff process unduly disrupt communications involving the mobile node, the NAS may wait until the mobile node is idle before forcing the home agent handoff to occur. That is, the NAS may wait until there is an absence of bearer data communication (e.g., packet data) transmitted to/from the mobile node, via the NAS, for a threshold period of time, such as a particular number of seconds for instance. At that point, a reasonable assumption is that any disruption resulting from the home agent handoff is unlikely to affect data communications involving the mobile node. Thus, the NAS may then trigger the home agent handoff.

As further noted above, it is possible that the mobile node may respond to receipt of the MIP teardown message by seeking to tear down the data link that the mobile node has with the NAS. In particular, as shown in dashed lines in FIG. 5, at block 222, the NAS may receive from the mobile node a data link layer connection teardown request. For instance, if the data link layer connection is a PPP connection, the NAS may receive from the mobile node a CONFIG_TERMINATE message.

To help avoid the wasteful result of tearing down the mobile node's data link only to have the mobile node reacquire the data link, the NAS may respond to such as data link layer connection teardown request by sending to the mobile node a rejection of the data link layer connection teardown request, as shown at block 224. For instance, in response to a CONFIG_TERMINATE message, the NAS may send to the mobile node a CONFIG_REJECT message. The NAS may thereby maintain its data link layer connection with the mobile node.

As further noted above, the NAS can take various forms, and communications between the NAS and the mobile node can take various forms. By way of example, the mobile node may be served by a cellular RAN, such as a network providing a CDMA air interface through which the mobile node may communicate with the RAN. The NAS may then comprise a PDSN that provides connectivity between the RAN and a packet-switched network, and the data link layer connection between the PDSN and the mobile node may comprise a PPP link spanning the CDMA air interface.

As another example, the mobile node may be served by a WiFi access point that provides an 802.11 air interface through which the mobile node may communicate with the access point. The NAS may then comprise a PDIF that provides connectivity between the RAN and a packet-switched network, and the data link layer connection between the PDIF and the mobile node may comprise an IPsec tunnel spanning the 802.11 air interface.

As noted above, another issue that can arise when forcing home agent handoff when using IPsec is that, when the mobile node undergoes registers with the new home agent, the MIP RRQ that the mobile node sends may include the mobile node's old HoA as its IPsec TiA. As a result, the MIP RRP that the home agent returns may then get routed to the mobile node's old home agent, with which the indicated TiA was associated.

To avoid that result, at block 210, once the NAS tears down the mobile node's old MIP session as described above, the NAS may direct the mobile node to use a new TiA that is not the mobile node's old HoA (namely, the home address assigned by the first MIP home agent) but that is still routable to the NAS, so that an RRP will still be properly routed to the NAS for transmission to the mobile node. In turn, at block 220, once the MIP re-registration process is complete, the NAS may then direct the mobile node to use as a TiA the HoA that the new home agent assigned for use by the mobile node. The NAS may use PANA signaling or another mechanism to direct the mobile node to use a particular TiA.

Figure 6:
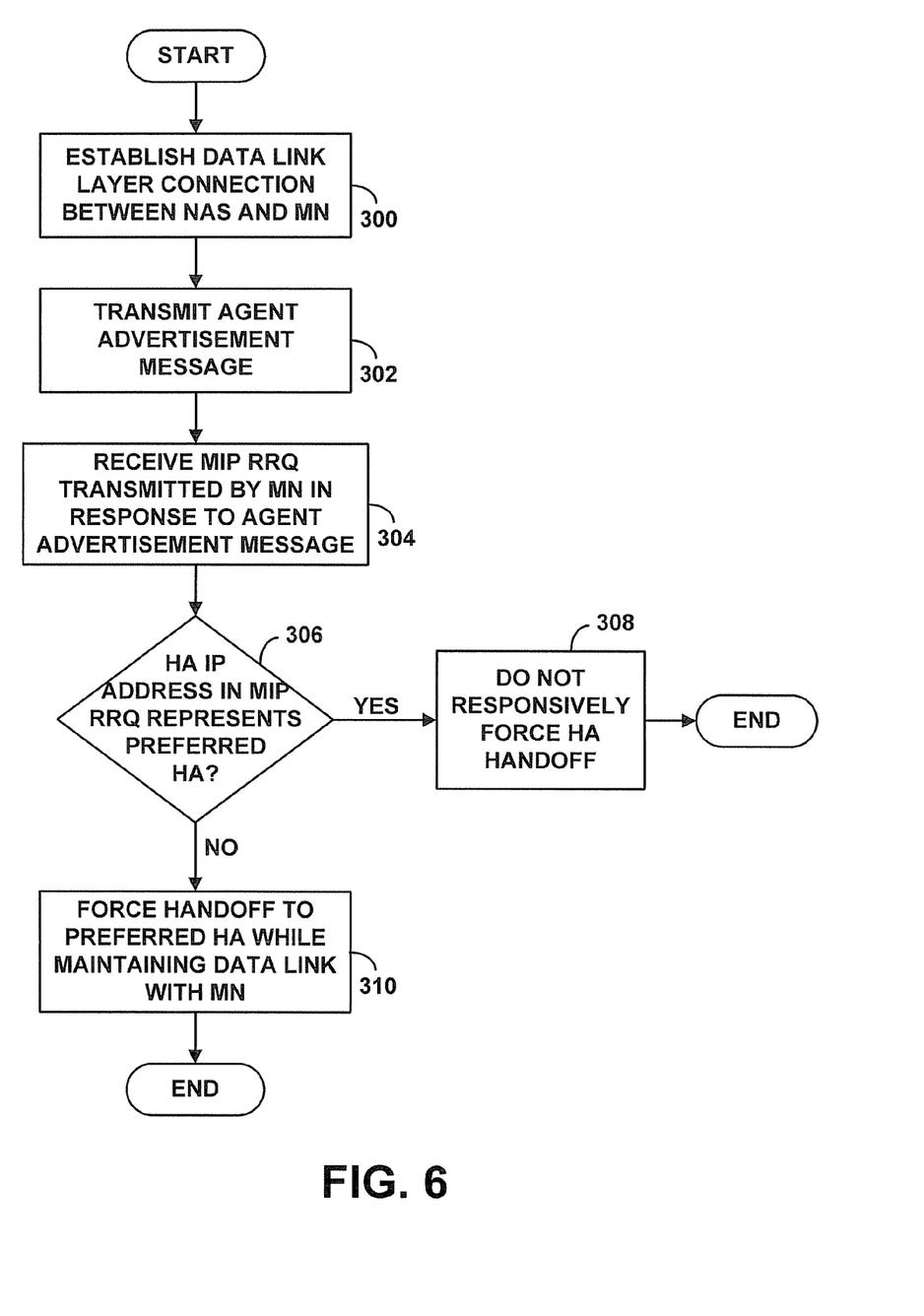
FIG. 6 is another flow chart depicting functions that can be carried out in accordance with the exemplary embodiment.

FIG. 6 is next a flow chart depicting another set of functions that can be carried out by an exemplary NAS/FA in accordance with the exemplary embodiment. The method of FIG. 6 may be triggered upon movement of a mobile node into the coverage area served by a network access server that serves as a MIP foreign agent, such as NAS/FA 16 for instance.

As shown at FIG. 6, at block 300, the method involves establishing a data link layer connection between the NAS and the mobile node. Again, this function may involve establishing a PPP link, an IPsec tunnel, or any other type of data link layer connection. At block 302, the FA may then transmit, over a wireless air interface for instance, an agent advertisement message that specifies an IP address of the FA. As noted above, this message may be an ICMP Type 9 message, and it may flow over the established data link layer connection to the mobile node.

At block 304, the method may then involve receiving at the FA from the mobile node, a MIP RRQ that the mobile node transmitted in response to the agent advertisement message. The MIP RRQ may specify, among other information, a MIP home agent IP address and a MIP home address (HoA) of the mobile node. In accordance with the method, at block 306, the FA may then determine whether the MIP home agent IP address specified by the MIP RRQ represents a preferred MIP home agent.

If the determination is that the MIP home agent IP address represents the preferred home agent, then, at block 308, the FA would not responsively force a handoff of the mobile node to the preferred MIP home agent, possibly after the MIP registration process with the current home agent is complete. On the other hand, if the determination is that the MIP home agent IP address does not represent the preferred MIP home agent, then, at block 310, the FA would responsively force a handoff of the mobile node to the preferred MIP home agent while maintaining the data link layer connection with the mobile node.

As in the method of FIG. 5, the method of FIG. 6 may involve forcing the home agent handoff to occur in response to detecting absence of bearer data communication to and from the mobile node via the network access server (e.g., via the FA) for at least a threshold period of time, so as to help avoid disrupting active communication to/from the mobile node.

Further, as in the method of FIG. 5, the act of forcing the mobile node to hand off to the preferred MIP home agent while maintaining the data link layer connection with the mobile node in the method of FIG. 6 may involve (i) generating and sending to the mobile node a request for the mobile node to tear down a MIP session between the mobile node and the MIP home agent represented by the MIP home agent IP address specified by the MIP RRQ, (ii) receiving from the mobile node a data link layer connection teardown request generated by the mobile node in response to the request for the mobile node to tear down the MIP session, (iii) rejecting the data link layer connection teardown request, so as to maintain the data link layer connection with the mobile node, (iv) sending another agent advertisement message to the mobile node to trigger MIP registration by the mobile node, (v) receiving another MIP RRQ sent by the mobile node in response to the new agent advertisement message, and (vi) sending the new MIP RRQ to the preferred MIP home agent to facilitate registration of the mobile node with the preferred MIP home agent.

An exemplary embodiment of the invention has been described above. Those of ordinary skill in the art will appreciate, however, that modifications may be made while remaining within the scope of the invention as defined by the claims.

We claim:

1. In a network access server operating as a mobile-IP (MIP) foreign agent, a method of managing communications with a mobile node having a data link layer connection with the network access server, wherein the mobile node has a first MIP session with a first MIP home agent, the method comprising:
   making a determination of whether the first MIP home agent is a particular MIP home agent;
   if the determination is that the first MIP home agent is the particular MIP home agent, then not responsively forcing handoff of the mobile node to the particular MIP home agent; and
   if the determination is that the first MIP home agent is not the particular MIP home agent, then responsively forcing handoff of the mobile node to the particular MIP home agent, wherein forcing handoff of the mobile node to the particular MIP home agent comprises (i) generating and sending to the mobile node a MIP teardown request requesting teardown of the MIP session, (ii) receiving from the mobile node a data link layer connection teardown request, (iii) responsively sending to the mobile node a rejection of the data link layer connection teardown request, so as to maintain the data link layer connection with the mobile node, (iv) receiving from the mobile node an acceptance of the MIP teardown message, (v) sending an agent advertisement message to the mobile node to trigger MIP registration by the mobile node, (vi) receiving a MIP registration request sent by the mobile node in response to the agent advertisement message, and (vii) sending the MIP registration request to the particular MIP home agent to facilitate registration of the mobile node with the particular MIP home agent.

2. The method of claim 1, further comprising carrying out the method in response to the mobile node handing off to the network access server.

3. The method of claim 2, wherein making the determination of whether the first MIP home agent is the particular MIP home agent comprising:
   receiving from the mobile node a MIP registration request designating an IP address of the
   first home agent; and
   determining whether the IP address designated by the MIP registration request is an IP address of the particular MIP home agent and, if so, concluding that the first MIP home agent is the
   particular MIP home agent.

4. The method of claim 1,
   wherein sending the MIP teardown request to the mobile node comprises sending the MIP teardown request to the mobile node via the data link layer connection, and
   wherein receiving the acceptance from the mobile node comprises receiving the acceptance from the mobile node via the data link layer connection.

5. The method of claim 1, further comprising:
   detecting that the mobile node is idle, and carrying out the forcing handoff in response to detecting that the mobile node is idle.

6. The method of claim 5, wherein detecting that the mobile node is idle comprises detecting that the mobile node is idle for a threshold period of time.

7. The method of claim 6, wherein detecting that the mobile node is idle for a threshold period of time comprises detecting absence of bearer data communication to and from the mobile node, via the network access server, for at least the threshold period of time.

8. The method of claim 1, wherein the data link layer connection comprises a point-to-point protocol (PPP) data link layer connection, wherein the data link layer connection teardown request comprises a CONFIG_TERMINATE message, and wherein the rejection of the data link layer connection teardown request comprises a CONFIG_REJECT message.

9. The method of claim 1, wherein the data link layer connection spans a CDMA air interface between the mobile node and a radio access network serving the mobile node, the network access server providing connectivity between the radio access network and a packet-switched network.

10. The method of claim 9, wherein the network access server comprises a packet data serving node (PDSN).

11. The method of claim 1, wherein the data link layer connection comprises an IPsec connection in which the mobile node has a tunnel-inner-address (TiA) that the mobile node uses as a source address of packets that the mobile node encrypts and sends to the network access server,
the method further comprising:
after sending the MIP teardown request to the mobile node and receiving the acceptance from the mobile node, directing the mobile node to use as the TiA an address other than an address that the mobile node has been using as the TiA; and
after registration of the mobile node with the particular MIP home agent, directing the mobile node to use as the TiA a MIP home address assigned to the mobile node by the particular home agent.

12. The method of claim 11, wherein the address that the mobile node has been using as the TiA is a MIP home address assigned to the mobile node by the first MIP home agent.

13. The method of claim 1, wherein the data link layer connection spans an 802.11 WiFi air interface between the mobile node and a radio access network serving the mobile node, the network access server providing connectivity between the radio access network and a packet-switched network.

14. The method of claim 11, wherein the network access server comprises a packet data interworking function (PDIF).

15. The method of claim 1, wherein the mobile node is a portable, handheld, battery-powered wireless communication device.

16. A method of managing communications with a mobile node, method comprising:
upon movement of the mobile node into a coverage area served by a network access server, establishing a data link layer connection between the network access server and the mobile node, the network access server serving as a mobile-IP (MIP) foreign agent;
transmitting from the MIP foreign agent over a wireless air interface a first agent advertisement message specifying an IP address of the MIP foreign agent;
receiving at the MIP foreign agent from the mobile node first MIP registration request (RRQ) transmitted by the mobile node in response to the first agent advertisement message, the first MIP RRQ specifying at least (i) a MIP home agent IP address and (ii) a MIP home address (HoA) of the mobile node;
at the MIP foreign agent, making a determination of whether the MIP home agent IP address specified by the first MIP RRQ represents a preferred MIP home agent;
if the determination is that the MIP home agent IP address represents the preferred home agent, then not responsively forcing a handoff of the mobile node to the preferred MIP home agent; and
if the determination is that the MIP home agent IP address does not represent the preferred MIP home agent, then responsively forcing handoff of the mobile node to the preferred MIP home agent while maintaining the data link layer connection with the mobile node,
wherein forcing the mobile node to hand off to the preferred MIP home agent while maintaining the data link layer connection with the mobile node comprises:
generating and sending to the mobile node a request for the mobile node to tear down a MIP session between the mobile node and the MIP home agent represented by the MIP home agent IP address specified by the first MIP RRQ;
receiving from the mobile node a data link layer connection teardown request generated by the mobile node in response to the request for the mobile node to tear down the MIP session;
rejecting the data link layer connection teardown request, so as to maintain the data link layer connection with the mobile node;
sending a second agent advertisement message to the mobile node to trigger MIP registration by the mobile node;
receiving a second MIP RRQ sent by the mobile node in response to the second agent advertisement message; and
sending the second MIP RRQ to the preferred MIP home agent to facilitate registration of the mobile node with the preferred MIP home agent.

17. The method of claim 16, further comprising carrying out the forcing handoff in response to detecting absence of bearer data communication to and from the mobile node, via the network access server, for at least a threshold period of time.

18. A network access server comprising:
a first network communication interface for communicating with nodes served by the network access server;
a second network communication interface for communicating on a packet-switched network;
a processor;
data storage;
first logic stored in the data storage and executable by the processor to establish a data link layer connection with a mobile node via the first communication interface; and
second logic stored in the data storage and executable by the processor to:
(A) transmit via the communication interface a first agent advertisement message,
(B) receive from the mobile node, a first mobile-IP (MIP) registration request (RRQ) transmitted by the mobile node in response to the first agent advertisement message, the first MIP RRQ specifying at least a MIP home agent IP address and a MIP home address (HoA) of the mobile node,
(C) make a determination of whether the MIP home agent IP address specified by the first MIP RRQ represents a preferred MIP home agent,
(D) if the determination is that the MIP home agent IP address represents the preferred home agent, then not responsively force handoff of the mobile node to the preferred MIP home agent, and
(E) if the determination is that the MIP home agent IP address does not represent the preferred MIP home agent, then responsively force handoff of the mobile node to the preferred MIP home agent while maintaining the data link layer connection with the mobile node by performing functions comprising:
generating and sending to the mobile node a request for the mobile node to tear down a MIP session between the mobile node and the MIP home agent represented by the MIP home agent IP address specified by the first MIP RRQ;

receiving from the mobile node a data link layer connection teardown request generated by the mobile node in response to the request for the mobile node to tear down the MIP session;

rejecting the data link layer connection teardown request, so as to maintain the data link layer connection with the mobile node;

sending a second agent advertisement message to the mobile node to trigger MIP registration by the mobile node;

receiving a second MIP RRQ generated by the mobile node in response to the second agent advertisement message; and sending the second MIP RRQ to the preferred MIP home agent to facilitate registration of the mobile node with the preferred MIP home agent.

19. The network access server of claim 18, wherein the second logic is executed to force handoff of the mobile node to the preferred MIP home agent in response to detecting absence of bearer data communication to and from the mobile node for at least a threshold period of time.

* * * * *